W. C. DENISON.

BUILDING BLOCK.

APPLICATION FILED APR. 13, 1911.

Reissued Oct. 17, 1911.

13,299.

Witnesses:

A. L. Lord.

Brennan & West.

Inventor.

William C. Denison,

By Albert H. Bates,

Atty.

UNITED STATES PATENT OFFICE.

WILLIAM C. DENISON, OF CLEVELAND HEIGHTS, OHIO, ASSIGNOR TO THE OHIO CLAY COMPANY, OF CLEVELAND, OHIO, A CORPORATION OF OHIO.

BUILDING-BLOCK.

13,299. Specification of Reissued Letters Patent. Reissued Oct. 17, 1911.

Original No. 942,621, dated December 7, 1909, Serial No. 455,667. Application for reissue filed April 13, 1911. Serial No. 620,962.

*To all whom it may concern:*

Be it known that I, WILLIAM C. DENISON, a citizen of the United States, residing at Cleveland Heights, in the county of Cuyahoga and State of Ohio, have invented a certain new and useful Improvement in Building-Blocks, of which the following is a full, clear, and exact description, reference being had to the accompanying drawings.

The object of this invention is to provide a building block in a form possessing great adaptability in use and producing a very strong wall.

My block is formed with a mortar-carrying surface divided to produce two mortar beds, so that the block may be wide and at the same time the mortar beds small enough so that each receives the proper amount of mortar when the wall is laid up in the manner usual with brick masons.

My block is formed with two parts in interrupted relation as a head and a tongue projecting from the side of the head, which parts may bear such relation to each other that the blocks may be laid up to produce walls of varying thickness and also to receive header courses where desired.

My blocks are hollow for cheapness and lightness, but are provided with webs so arranged that when the blocks are built into a wall the webs stand in vertical tiers, whereby the strength of the wall to resist any crushing strain is enormously increased. The system of heads and tongues also makes a continuous interlock in the courses and breaks the joint between them, so that the wall is tighter and much stronger against any lateral strain than the ordinary wall.

It is to be understood that, while the relation which the tongue of my block and the head bear to each other is of importance in producing the result I do, I do not intend to limit myself to any specific dimensions. The block may be made in any length and the head and tongue of any width or height. As, however, my blocks are of great value in producing a backing wall for a facing of pressed brick which should be interlocked thereto by header courses, I find it preferable to so dimension my block as to cooperate with standard bricks.

The invention comprises the block formed to give the characteristics above mentioned, as herein illustrated and hereinafter more definitely explained and summarized in the claims.

The invention includes also the combination with such a block of a brick wall having a coöperating header course.

Figure 1:
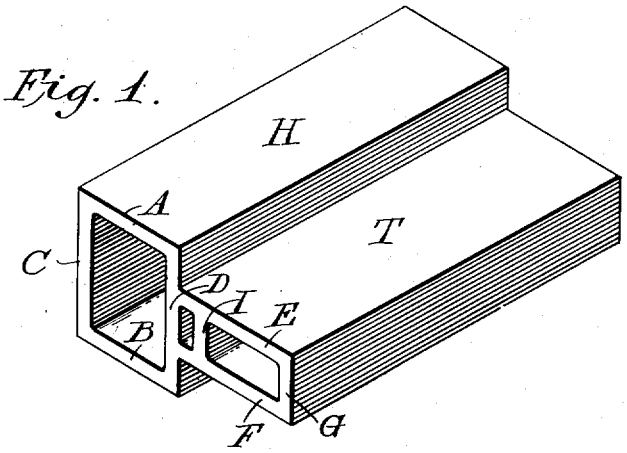
Figure 2:
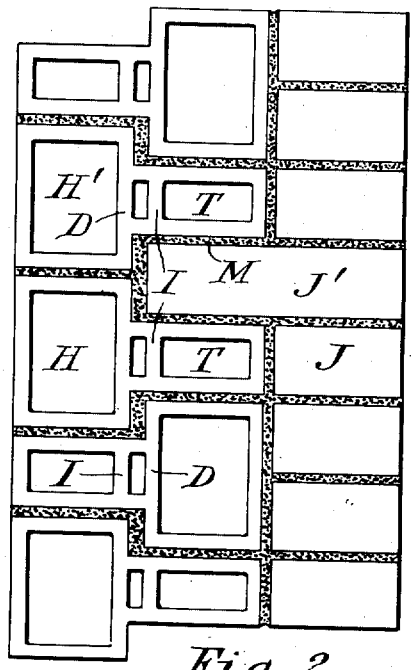
Figure 3:
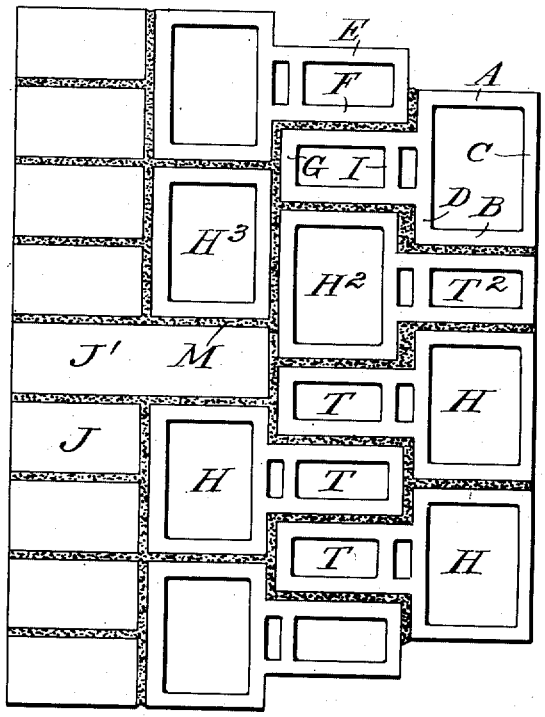

In the drawings, Figure 1 is a perspective view of my block; Figs. 2 and 3 are vertical end views of walls built up of my blocks and a facing course of brick. In Fig. 2 the back wall provided by my blocks is approximately twice the width of the standard brick, while in Fig. 3 it is approximately three times the width.

The length of my block may be anything desired. The width of the head and the width of the tongue are preferably approximately equal to the width of an ordinary brick, while the thickness of the tongue is preferably that of an ordinary brick and the head approximately twice that thickness.

In the drawings, reference character H (with or without exponents) indicates the head, T the tongue and M the mortar.

A and B indicate the top and bottom walls of the head and C and D the vertical walls thereof. Similarly, E and F are the top and bottom of the tongue, G the outer wall thereof and I the inner partition or web. The bottom portion of the block shown is a duplicate of the top portion, and accordingly the block may stand either side up. Hence, either the surfaces A and E or the surfaces B and F constitute the two mortar beds, according to which side of the block is uppermost. As will be seen, the tongue projects from the middle of the side D of the head. That is, the space between the surface E and the surface A is the same as the space between the bottom surface F and the bottom surface B. The height G of the tongue is preferably that of a standard brick. The height of the head if the mortar were disregarded would be twice that of the tongue; but, owing to the courses of mortar, as hereinafter explained, the height of the head is preferably more than twice the height of the tongue by the thickness of one course of mortar. The width of the head is preferably somewhat less than the width of the tongue, the web I and the wall G being preferably the same distance apart as are the walls C and D. The width of the head is preferably less than half the total width of the block by an amount corresponding to one course of mortar, while the width of the tongue is preferably one course of mortar more than half the total width.

Taking a concrete illustration and without limiting myself to particular dimensions, it may be observed that a standard brick is $2\frac{3}{8}''$ high, 4″ wide and $8\frac{1}{4}''$ long. Accordingly, for coöperation with such bricks it would be convenient to make my brick of the following dimensions; length, say 12 inches, so as to break courses with the brick face, the height of the tongue $2\frac{3}{8}''$, height of the head twice this plus the thickness of a mortar course, that is, 5 inches; the width of a head 4 inches, the width of the tongue $4\frac{1}{2}$ inches, the space between the wall D and the web I being $\frac{1}{2}$ inch, and the total width of the block being $8\frac{1}{2}$ inches. Bricks of such dimensions may be very conveniently laid up with standard brick of the dimensions given.

Fig. 2 shows a facing wall J of a single course of bricks backed up by what is commonly called an 8 inch wall of my building blocks. In making such 8 inch wall, I place my blocks one above the other alternately, the head of one block going over the tongue of the block below it and the tongue coming over the head of the block below it. This brings the wall D of the head directly over the web I of the tongue below it and the web I of the tongue directly over the wall D of the head below it, so that with such a wall there are four upright tiers of strain-resisting sections, namely, the left hand edge of the backing wall, the right hand edge, and two near the middle. Fig. 2 shows also the course of the mortar for an 8 inch wall of my blocks. These mortar courses are of the usual thickness except that they are thickened a little in the vertical courses where the heads overlap.

J′ represents a header course in the facing wall. This I accommodate in my backing wall by turning the building blocks around so that the heads H′ of one course come over the heads H of the course below it. This brings the two tongues T over the other and leaves a space between them sufficient for the header course J′ with the mortar M around it.

Fig. 3 illustrates my blocks built up to make a so-called 12 inch backing wall. Here the heads H are normally one above the other and the tongues one above the other. To accommodate a header course J′ of the facing wall J, I reverse one of the courses of blocks farthest from the wall, bringing its head $H^2$ over the tongue T below it and its tongue $T^2$ over the head H below it. Above this reversed course the blocks continue as below it. This reversed course leaves a space corresponding to three courses of the bricks J. The space of two of such courses I fill by a hollow block $H^3$ corresponding to the head portion of my block. In fact, this block may be provided by simply knocking off the tongue from my block. The space left between such block $H^3$ and the head H below it is of the proper size for receiving the header course J′ with the corresponding mortar courses F. This 12 inch wall has six upright lines of strain-resisting material, namely, the outermost walls of the two sets of heads H, the innermost walls of those heads and the intermediate tiers of webs I and walls G of the tongues. These intermediate tiers it will be seen are somewhat staggered, but each web or wall overlaps the wall below it, so that the downward stress is amply provided for.

My building block may be made of any suitable material, as clay, cement, concrete, etc.; it is cheaply constructed and, as shown, is extremely adaptable in its application. Blocks of one shape are adapted to produce walls of varying thickness, so that it is not necessary to keep in stock a number of shapes of blocks.

My block is much stronger in resisting downward strain than the ordinary commercial brick, while the overlapping shoulders provided by the heads and tongues give the wall a lateral stiffness which is far in excess of the ordinary wall. Another advantage of a wall built of my blocks is the non-conductivity thereof for moisture, heat, cold, sound, etc. This is due to the overlapping of the air-containing heads and tongues of my blocks, confined air being, of course, an excellent non-conductor. All of the horizontal mortar joints in my wall terminate opposite hollow spaces in the blocks, and hence any passage of moisture, etc., along the mortar course, or through the blocks themselves is interrupted. These features make my wall very desirable, whether as an outside wall or a partition wall. For a partition wall between different apartments, for example, the sound-proof feature is particularly advantageous.

I have shown the wall made by my blocks in the form of a backing wall for a facing course. It is to be understood, however, that it may be used independently of such course and will frequently be so used in partition walls and all places where the appearance is not the controlling factor. I have shown it with the facing walls to illustrate at once its own construction and use and its combination with the header courses of such walls.

Having thus described my invention, what I claim is:—

1. A building block for wall structures consisting of two hollow rectangular members connected in interrupted relation to provide a top made up of two independent mortar beds, and provided with two outer walls and two inner webs whereby when a plurality of said blocks are imposed one upon another in a wall structure, said webs stand in vertical tiers throughout the structure.

2. A hollow building block having opposite faces interrupted intermediately to provide whichever side is uppermost, a top consisting of two mortar beds only, said block having two vertical internal webs normal to the mortar beds and positioned respectively beneath the inner part of said mortar beds, whereby when the blocks are placed surmounting one another in a wall there are provided two vertical tiers of internal webs.

3. A building block having a hollow rectangular head, a hollow tongue extending from the middle of the side of the head for a distance substantially equal to the distance across the head, the thickness of said tongue being substantially half the thickness of the head, and the wall of the head adjacent to the tongue extending continuously across the tongue to make a separating web between them.

4. In a building block, the combination of a hollow rectangular head, a hollow tongue extending from the middle of one side of the head, the side of the head adjacent to the tongue forming one continuous alined wall across the end of the tongue, and an internal web within the tongue parallel to and adjacent to said side of the head, the location of the web in the tongue being such that in a wall the web may take a position substantially in line with the end wall of the tongues to form a continuous series of supporting members.

5. In a building block, the combination of a comparatively long hollow head, rectangular both internally and externally in cross section, and a tongue projecting from one of the sides of the head and having parallel top and bottom faces whose distance apart is substantially half that of the distance between the top and bottom faces of the head, the tongue being of the same length as the head and being hollow, the hollows of the head and tongue extending continuously from one end of the block to the other and each being of substantially the same cross section throughout.

6. In a building block, the combination of a hollow rectangular head, a hollow rectangular tongue projecting from the middle of the side of the head, the adjacent wall of the head extending continuously across the adjacent side of the tongue, the tongue having an internal web parallel with and adjacent to the said wall of the head, the thickness of the tongue from top to bottom being substantially half that of the corresponding dimension of the head, the width of the tongue being equal to the width of the head plus the distance between said internal web and the adjacent wall of the head, and the length of the tongue being equal to the length of the head.

7. In a building block, the combination of a hollow rectangular head, a hollow rectangular tongue projecting from the middle of the side of the head, the adjacent wall of the head extending in one continuous plane across the adjacent side of the tongue, the tongue having an internal web parallel with and adjacent to the side wall of the head, the thickness of the tongue from top to bottom being substantially half the corresponding dimension of the head, the width of the tongue being equal to the width of the head plus the distance between the internal web and the adjacent wall of the head, and the length of the tongue being equal to the length of the head, whereby said blocks may be set up in a wall either with the blocks alternately placed or with the heads alining and the tongues alining, in each case there being a continuous series of supporting members, one above the other, provided by the respective walls and webs.

8. As a new article of manufacture a hollow building block, consisting of two portions relatively offset one with reference to the other, whereby the block is capable of having only two mortar beds between it and a similar adjacent block above it, the block having an interior vertical web transverse to the planes of the mortar beds and adapted to stand in alinement with a web in such similar adjacent block when the latter rests on the two mortar beds and the sides of the blocks are in alinement.

9. As a new article of manufacture a hollow building block having opposite faces each consisting of two planes offset with reference to each other, whereby whichever side of the block is uppermost there are two mortar beds, said block having two outside walls and an internal web alined with an external intermediate wall connecting offset surfaces of one face of the block, and another internal web spaced from the other side of the block a distance corresponding to that at which the web first mentioned is spaced from its side, the space between the two webs being less than the space between either web and the outside wall.

In testimony whereof, I hereunto affix my signature in the presence of two witnesses.

WILLIAM C. DENISON.

Witnesses:

ALBERT H. BATES,
BRENNAN B. WEST.